United States Patent
Coady et al.

(10) Patent No.: US 12,277,442 B2
(45) Date of Patent: Apr. 15, 2025

(54) QUANTUM COMPUTER SYSTEM SCHEDULING AND PARAMETERIZATION BASED ON ERROR CORRECTION HISTORY

(71) Applicant: RED HAT, INC., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 610 days.

(21) Appl. No.: 17/577,842

(22) Filed: Jan. 18, 2022

(65) Prior Publication Data

US 2023/0229491 A1   Jul. 20, 2023

(51) Int. Cl.
| | |
|---|---|
| *G06F 9/46* | (2006.01) |
| *G06F 9/48* | (2006.01) |
| *G06F 11/07* | (2006.01) |
| *G06N 10/60* | (2022.01) |
| *G06N 10/70* | (2022.01) |
| *G06N 10/80* | (2022.01) |

(52) U.S. Cl.
CPC ........ *G06F 9/4881* (2013.01); *G06F 11/0706* (2013.01); *G06F 11/0787* (2013.01); *G06F 11/0793* (2013.01); *G06N 10/60* (2022.01); *G06N 10/70* (2022.01); *G06N 10/80* (2022.01)

(58) Field of Classification Search
CPC ............... G06F 9/4881; G06F 11/0706; G06F 11/0787; G06F 11/0793; G06N 10/80; G06N 10/60; G06N 10/70
See application file for complete search history.

(56) References Cited

U.S. PATENT DOCUMENTS

| | | |
|---|---|---|
| 10,692,009 B2 | 6/2020 | Kelly |
| 10,922,166 B2 | 2/2021 | Hogaboam |
| 10,997,044 B2 | 5/2021 | Kelly |
| 11,087,232 B2 | 8/2021 | Ducore et al. |
| 2019/0042966 A1 | 2/2019 | Hogaboam et al. |
| 2021/0067176 A1 | 3/2021 | Leipold et al. |

OTHER PUBLICATIONS

Nautrup, H.P., et al., "Optimizing Quantum Error Correction Codes with Reinforcement Learning," Quantum, 2020, https://quantum-journal.org/papers/q-2019-12-16-215/.
Valenti, A., et al., "Hamiltonian Learning for Quantum Error Correction," Physical Review Research, Nov. 11, 2019, https://journals.aps.org/prresearch/pdf/10.1103/PhysRevResearch.1.033092.

*Primary Examiner* — Gregory A Kessler
(74) *Attorney, Agent, or Firm* — Kilpatrick Townsend & Stockton LLP

(57) ABSTRACT

In one example described herein a system can receive, by a scheduler of a server, a request to execute a quantum algorithm. The system can determine, by the scheduler, a quantum computer system of a plurality of quantum computer systems to execute the quantum algorithm based on a database that stores associations between each quantum computer system of the plurality of quantum computer systems, at least one parameter associated with the quantum algorithm, and error information. The system can transmit, by the scheduler, the request to the quantum computer system for executing the quantum algorithm.

20 Claims, 3 Drawing Sheets

QUANTUM COMPUTER SYSTEM SCHEDULING AND PARAMETERIZATION BASED ON ERROR CORRECTION HISTORY

TECHNICAL FIELD

The present disclosure relates generally to quantum computer systems. More specifically, but not by way of limitation, this disclosure relates to quantum computer system scheduling and parameterization based on error correction history.

BACKGROUND

Quantum computers perform computations utilizing quantum-mechanical phenomena, such as superposition, interference and entanglement. Unlike classical computers that process data encoded in binary bits, each of which is in one of two definite states ("0" or "1"), quantum computers process data in units of quantum bits (qubits) that can be in a superposition of states. "Superposition" refers to the ability of each qubit to represent both a "0" and "1" at the same time. The qubits in a superposition can be correlated with each other (referred to as "entanglement"). That is, the state of a given qubit (whether it is a "0" or "1") can depend on the state of another qubit. A quantum computer with N qubits can be in a superposition of up to $2^N$ states simultaneously. Compared to the classical computers that can only be in one of these $2^N$ states at a particular time, quantum computers may solve difficult problems that are infeasible using classical computers.

Qubits stop being superposition and return to classical values of "0" or "1" after intentional observation or unintentional error, such as a radiation leak. The value of a single qubit after observation is completely random. Quantum computers may use superposition and quantum algorithms to create a deterministic sequence of qubit states before intentional observation occurs. Quantum algorithms may consist of an arrangement of quantum logic gates that qubits, bound by superposition and within a quantum computer, are subjected to. The arrangement of the quantum logic gates within a quantum algorithm, along with the dependent quantum states afforded by qubits in superposition, can guide a quantum algorithm towards an expected outcome.

DETAILED DESCRIPTION

Figure 1:
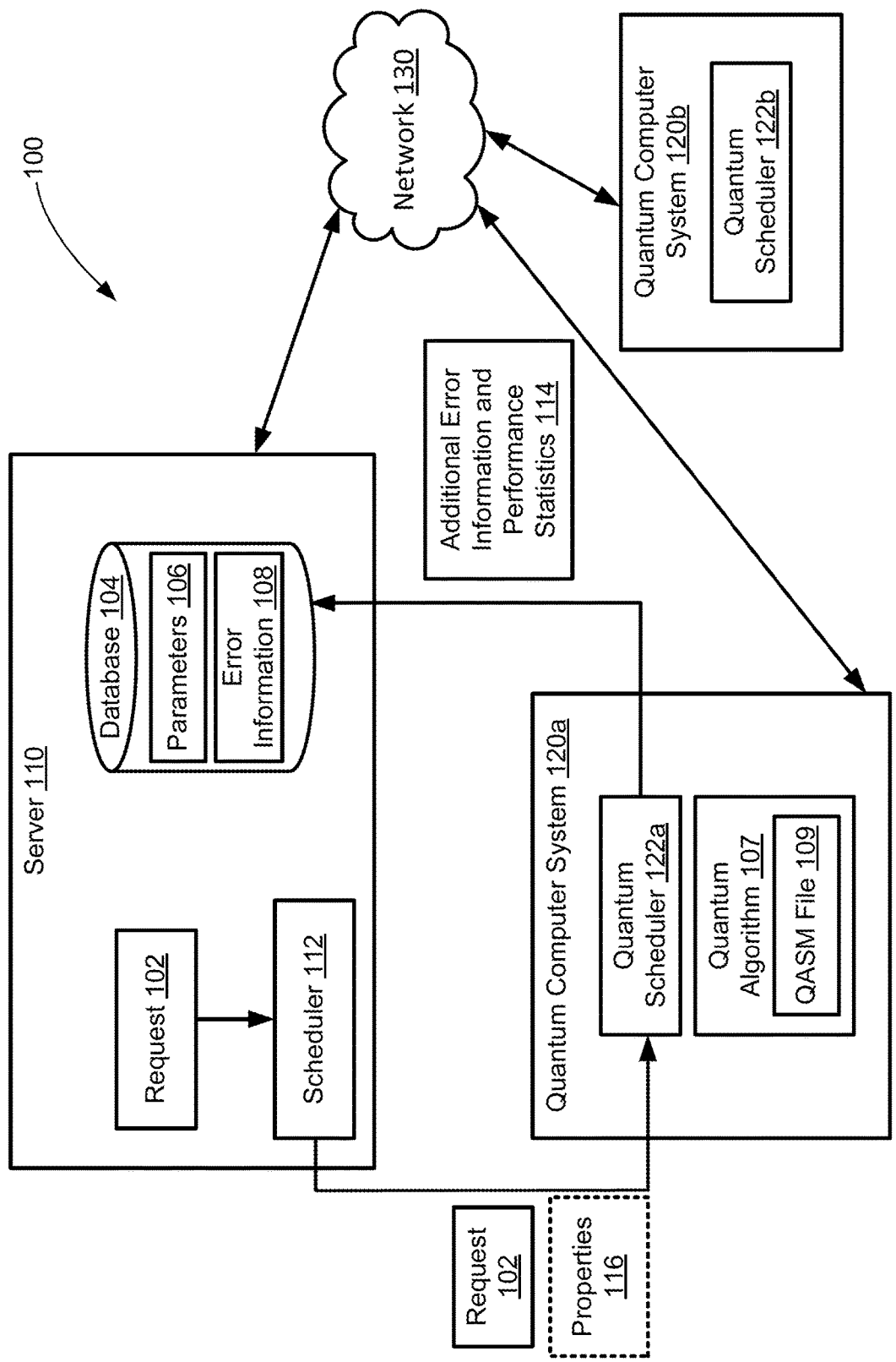
FIG. 1 is a block diagram of an example of a system for quantum computer system scheduling and parameterization based on error correction history according to one example of the present disclosure.

Certain aspects and examples of the present disclosure relate to scheduling and quantum algorithm parameterization of quantum computer systems based on error correction histories. It can be difficult to maintain a quantum state of a qubit, as qubits can suffer from quantum decoherence and state fidelity. Quantum decoherence can occur when there is a loss of ordering of phase angles between components of a qubit in superposition. As a result of quantum decoherence, qubits can return to behaving as binary bits. State fidelity may have degraded when a distance measure between quantum states, such as charge or spin, cannot be determined. To account for quantum decoherence and state fidelity, quantum computer systems may involve error correction.

Some examples of the present disclosure can overcome one or more of the abovementioned problems by providing a system that schedules quantum algorithms designed for execution in a quantum computer system based on error correction histories associated with the quantum algorithms. Scheduling a quantum algorithm based on historical error correction data can reduce the amount of error correction involved in executing the quantum algorithm. Reducing error correction may be desirable, as error correction can be expensive. Also, scheduling the quantum algorithm based on error correction histories can reduce the likelihood of a failure in which error correction methods may not be able to mitigate the behavior of qubits within a quantum computing system, resulting in the quantum computing system experiencing physical damage.

Errors may result from a variety of sources, including faults within logic gates of the quantum computer system or faults in preparing the quantum computer system. Error correction history may include a description or classification of various errors, the type of quantum computer system on which the error occurred, and parameters and information about the quantum algorithm.

The error correction history can be provided to a scheduler of a server. The server may receive a request to execute a quantum algorithm, determine a classification associated with the quantum algorithm, and consult a database to identify quantum computer systems that have a problematic history with quantum algorithms of the given classification. The scheduler may schedule the quantum algorithm on a quantum computer system amenable to the classification of the quantum algorithm associated with the request. The server can select a quantum computer system with a history of the least amount of errors for the given classification, which in turn may present the lowest risk of a catastrophic failure. Additionally, the server can determine and add an indication of additional parameters, such as a number or location of qubits reserved for the quantum algorithm, to the request to reduce a possibility of errors when executing the quantum algorithm.

A second scheduler of the quantum computer system, which can be referred to as a quantum scheduler, may receive the request with the indication of the additional parameters, request qubits for error correction for the quantum algorithm based on the additional parameters, and execute the quantum algorithm. During the execution of the quantum algorithm, the quantum scheduler may gather statistics and runtime data from errors and execution impacts related to the parameterization of the quantum algorithm. The quantum scheduler can communicate with the server to cross-analyze the information gathered by the quantum scheduler against the information stored in the server. Based on the analysis, the database can be updated with the information about the execution of the quantum algorithm by the quantum computer system. In addition, the quantum scheduler may direct the request to another quantum computer system if, during the execution of the quantum algorithm, a threshold level of errors is reached. Selecting a quantum computer system based on historical error corrections for a quantum algorithm can reduce a likelihood of errors occurring during execution, a likelihood of decoherence, thereby improving performance of the quantum computer system.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a system 100 for quantum computing system scheduling and parameterization based on error correction history according to one example of the present disclosure. The system 100 can include a server 110 and one or more quantum computer systems, such as quantum computer systems 120a-b. The server 110 can include a scheduler 112, and each of the quantum computer systems 120a-b can include a quantum scheduler, illustrated as quantum schedulers 122a-b in FIG. 1. The server 110 and the quantum computer systems 120a-b can communicate via a network 130, such as a local area network (LAN) or the Internet.

In an example, the server 110 can schedule requests for executing quantum algorithms on the quantum computer systems 120a-b. For instance, the server 110 can receive a request 102 to execute a quantum algorithm 107. The request 102 may be generated by a user interacting with the server 110. A scheduler 112 of the server 110 can receive and process the request 102 to determine which of the quantum computer systems 120a-b is to execute the quantum algorithm 107.

The server 110 can also include a database 104. The database 104 can store associations between each of the quantum computer systems 120a-b, parameters 106 of quantum algorithms, and error information 108 related to previous executions of the quantum algorithms on the quantum computer systems 120a-b. In particular, the database 104 can include associations between each of the quantum computer systems 120a-b and the quantum algorithm 107. Data about the quantum computer systems 120a-b included in the database 104 can include indications of machine types of the quantum computer systems 120a-b, a potential, or number of qubits, of the quantum computer systems 120a-b, and hardware of the quantum computer systems 120a-b.

In an example, the parameters 106 may include a number of qubits involved in executing the quantum algorithm 107, key times for tracking a coherence level in the quantum computer systems 120a-b during the execution of the quantum algorithm 107, an indication of the type of quantum computer system that the quantum algorithm 107 may be best executed on, or predicted temperatures of the quantum computer systems 120a-b during an execution of the quantum algorithm 107. The parameters 106 can also include a classification of the quantum algorithm 107, which can be associated with a type of problem that the quantum algorithm 107 aims to solve (e.g., a data problem or an optimization problem), how central processing unit (CPU) intensive the quantum algorithm 107 may be during execution, or how heat intensive the quantum algorithm 107 may be during execution.

To determine the classification of the quantum algorithm 107, the server 110 may simulate an execution of the quantum algorithm 107. Alternatively, a quantum assembly language (QASM) file of the quantum algorithm 107 may include an indication of the classification. A developer of the quantum algorithm 107 can include the classification in the QASM file, which can be accessed by the scheduler 112 when the request 102 is received. The QASM file 109 included in the quantum algorithm 107 may configure how the quantum algorithm 107 interfaces with the qubits of the quantum computer system 120a. The QASM file 109 may configure how the quantum algorithm 107 interfaces with quantum logic gates of the quantum computer system 120a. The QASM file 109 may also be decorated with developer comments. The QASM file 109 may also include additional information that the scheduler 112 has identified as beneficial to the execution of the quantum algorithm 107. The additional information may include historical information about utilizing additional qubits beyond what the quantum algorithm 107 explicitly requires or locational information about the qubits within the quantum computer system 120a. Additionally or alternatively, the server 110 may reference other factors about the quantum algorithm 107 associated with the request 102 to classify the quantum algorithm 107.

The error information 108 stored in the database 104 may be indicate types of errors encountered by the quantum computer systems 120a-b during a previous execution of the quantum algorithm 107, types of error correction techniques performed by the quantum computer systems 120a-b to correct the errors encountered during the previous execution of the quantum algorithm 107. Error correction techniques may include flipping qubit states, changing qubit spins, and subjecting qubits to particular logic gates. The error information 108 may also include information about errors encountered and mitigation techniques for executions of a quantum algorithm having the same classification as the quantum algorithm 107 on the quantum computer systems 120a-b.

Based on the associations stored in the database 104, the scheduler 112 can select a quantum computer system of the quantum computer systems 120a-b that is to execute the quantum algorithm 107. The scheduler 112 may select the quantum computer system 120a based on determining, from the database 104, that the quantum computer system 120a is historically associated with the least amount of errors for the quantum algorithm 107, or another quantum algorithm having the same classification as the quantum algorithm 107. Alternatively, the scheduler 112 may avoid executing the quantum algorithm 107 on a quantum computer system, such as the quantum computer system 120b, based on determining that the quantum computer system 120b has a history of errors associated with the classification ascribed to the quantum algorithm 107. In addition, the scheduler 112 may avoid executing the quantum algorithm 107 on the quantum computer system 120b to avoid unintentional entanglement effects that may disrupt the quantum algorithm 107 or a secondary quantum algorithm executing on a partition of the same quantum computer system 120b.

Along with the determination that the quantum computer system 120a is historically associated with the least amount of errors for the quantum algorithm 107, the scheduler 112 may select the quantum computer system 120a based on a computational complexity or resource utilization that can be correlated with certain types of errors. The scheduler 112 can consider the capability of the quantum computer system 120a, the complexity of other pending requests for the quantum computer system 120a, the workload of the quantum computer system 120a, the workload of at least one other quantum computer system 120b, the number of qubits involved in the execution of the quantum algorithm 107, or the material of the qubits that may be best suited for the execution of the quantum algorithm 107. The quantum computer system 120a may have qubits of different materials that may be selected for different behavioral dispositions. Examples of different qubit materials can include, but is not limited to, superconducting materials such as niobium and aluminum.

Upon selecting the quantum computer system 120a to execute the quantum algorithm 107, the scheduler 112 can transmit the request 102 to the quantum computer system 120a for executing the quantum algorithm 107. Prior to transmitting the request 102 to the quantum computer system 120a, the scheduler 112 can determine properties 116 that are to be associated with executing the quantum algorithm based on the parameters 106 in the database 104 or the QASM file 109. For example, the scheduler 112 can determine a number of qubits of the quantum computer system 120a to reserve for executing the quantum algorithm 107, which partition of the quantum computer system 120a to use, a type of qubits for executing the quantum algorithm 107, or a location of qubits within the quantum computer system 120a for executing the quantum algorithm 107. The scheduler 112 may reserve specific qubits due to physically-fixed positions that the qubits may have within the quantum computer system 120a. The physical positions of qubits within the quantum computer system 120a may impact the behavior of the qubits. For example, it may be desirable to assign qubits which are physically close together or physically distant to influence their affinity for entanglement. The scheduler 112 can transmit the properties 116 to the quantum computer system 120a along with, or included in, the request 102.

The quantum computer system 120a can include a quantum scheduler 122a that can receive the request 102 and interpret the properties 116 attached to the request 102. Based on the request 102 and the properties 116, the quantum scheduler 122a can make adjustments for the execution of the quantum algorithm 107. For instance, the quantum scheduler 122a can adjust the qubits that the quantum computer system 120a may use in executing the quantum algorithm 107. Also, the quantum scheduler 122a may also adjust which qubits of the quantum computer system 120a may be reserved for error correction. The quantum scheduler 122a may adjust the amount of CPU usage within the quantum computer system 120a that may be reserved for execution of the quantum algorithm 107 or another quantum algorithm also executing on the quantum computer system 120a.

During the execution of the quantum algorithm 107, the quantum scheduler 122a can communicate with the server 110. The quantum computer system 120a can monitor the execution of the quantum algorithm 107 to determine additional error information and performance statistics 114 associated with the execution. For example, the quantum scheduler 122a can determine there is an occurrence of an error during the execution of the quantum algorithm 107 and the quantum scheduler 122a can then initiate a corrective action to be performed for the error and monitor an effectiveness of the corrective action. The additional error information and performance statistics 114 can include an indication of the error, the type of the corrective action taken, and the effectiveness of the corrective actions. The additional error information and performance statistics 114 may also include a coherence level of the quantum computer system 120a, a score of resource utilization, a computational complexity of the quantum algorithm 107, a score of resource utilization associated with the quantum algorithm 107, data related to temperature, and a number of qubits used during the execution of the quantum algorithm 107. The additional error information and performance statistics 114 may also be correlated with the classification of the quantum algorithm 107.

The quantum scheduler 122a may transmit the additional error information and performance statistics 114 to the server 110 as a result of the quantum computer system 120a performing a correction to facilitate a more optimal outcome from the quantum algorithm 107. The additional error information and performance statistics 114 may report to the server 110 how a particular error correction service solved a particular error with a particular solution. The server 110 can update at least one of the parameters 106 or the error information 108 associated with the quantum algorithm 107 in the database 104 based on the additional error information and performance statistics 114.

Although FIG. 1 depicts a certain number and arrangement of components, other examples may include more components, fewer components, different components, or a different number of the components that is shown in FIG. 1. For instance, the system 100 can include more quantum computer systems than are shown in FIG. 1. Additionally, while one quantum algorithm is shown in FIG. 1, in other examples the system 100 may include more quantum algorithms.

Figure 2:
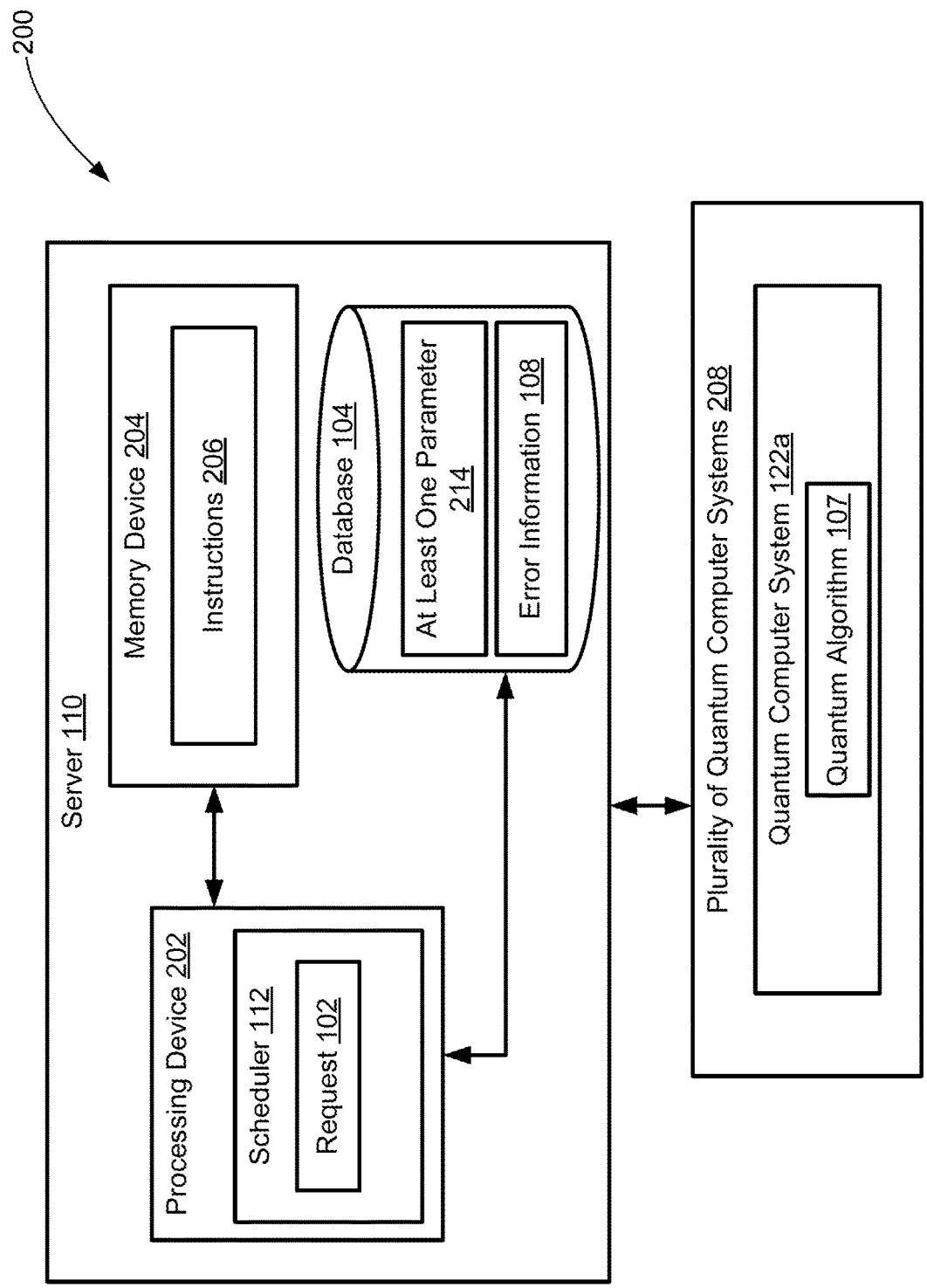
FIG. 2 is a block diagram of another example of a system for quantum computer system scheduling and parameterization based on error correction history according to one example of the present disclosure.

FIG. 2 is a block diagram of another example of a system 200 for quantum computer system scheduling and parameterization based on error correction history according to one example of the present disclosure. The system 200 includes a processing device 202 that is communicatively coupled to a memory device 204. In some examples, the processing device 202 and the memory device 204 can be part of the same computing device, such as the server 110. In other examples, the processing device 202 and the memory device 204 can be distributed from (e.g., remote to) one another.

The processing device 202 can include one processor or multiple processors. Non-limiting examples of the processing device 202 include a Field-Programmable Gate Array (FPGA), an application-specific integrated circuit (ASIC), or a microprocessor. The processing device 202 can execute instructions 206 stored in the memory device 204 to perform operations. The instructions 206 may include processor-specific instructions generated by a compiler or an interpreter from code written in any suitable computer-programming language, such as C, C++, C#, Java, or Python.

The memory device 204 can include one memory or multiple memories. The memory device 204 can be volatile or non-volatile. Non-volatile memory includes any type of memory that retains stored information when powered off. Examples of the memory device 204 include electrically erasable and programmable read-only memory (EEPROM) or flash memory. At least some of the memory device 204 can include a non-transitory computer-readable medium from which the processing device 202 can read instructions 206. A non-transitory computer-readable medium can include electronic, optical, magnetic, or other storage devices capable of providing the processing device 202 with computer-readable instructions or other program code. Examples of a non-transitory computer-readable medium can include a magnetic disk, a memory chip, ROM, random-access memory (RAM), an ASIC, a configured processor, and optical storage.

The processing device 202 can execute the instructions 206 to perform operations. For example, the processing device 202 can execute the scheduler 112, which can receive a request 102 for an execution of a quantum algorithm 107.

The processing device 202 can determine a quantum computer system 120a of a plurality of quantum computer systems 208 to execute the quantum algorithm 107 based on a database 104 that stores associations between each quantum computer system of the plurality of quantum computer systems 208, at least one parameter 214 associated with the quantum algorithm 107, and error information 108 associated with the quantum algorithm 107. The at least one parameter 214 can include a classification of the quantum algorithm 107. The classification of the quantum algorithm 107 may be based on an outcome of a simulation of the quantum algorithm 107 executed by the server 110 or a classification attributed to the quantum algorithm 107 by a developer, stored within a QASM file 109 associated with the quantum algorithm 107.

The processing device 202 can select the quantum computer system 120a from the plurality of quantum computer systems 208 based on the at least one parameter 214 and the error information 108. The scheduler 112 may select the quantum computer system 120a from the plurality of quantum computer systems 208 based on the capabilities of the quantum computer systems available within the plurality of quantum computer systems 208. The capability of quantum computer systems within the plurality of quantum computer systems 208 may vary based on the error history a given quantum computer system has with a particular classification of the quantum algorithm 107. The capability of the quantum computer systems within the plurality of the quantum computer systems 208 may also vary based on the complexity of the quantum algorithm 107 associated with the request 102, other quantum algorithms currently executing on the plurality of quantum computer systems 208, the number of qubits required to execute the quantum algorithm 107, or the material of the qubits within a given quantum computer system. The most desirable quantum computer system to execute the quantum algorithm 107 may be the quantum computer system that is determined to be least prone to errors for the classification. The scheduler 112 may avoid executing the quantum algorithm 107 on a quantum computing system that has a history of errors with the classification of the quantum algorithm 107, as determined from the database 104. The processing device 202 can transmit the request 102 to the quantum computer system 120a for executing the quantum algorithm 107.

Figure 3:
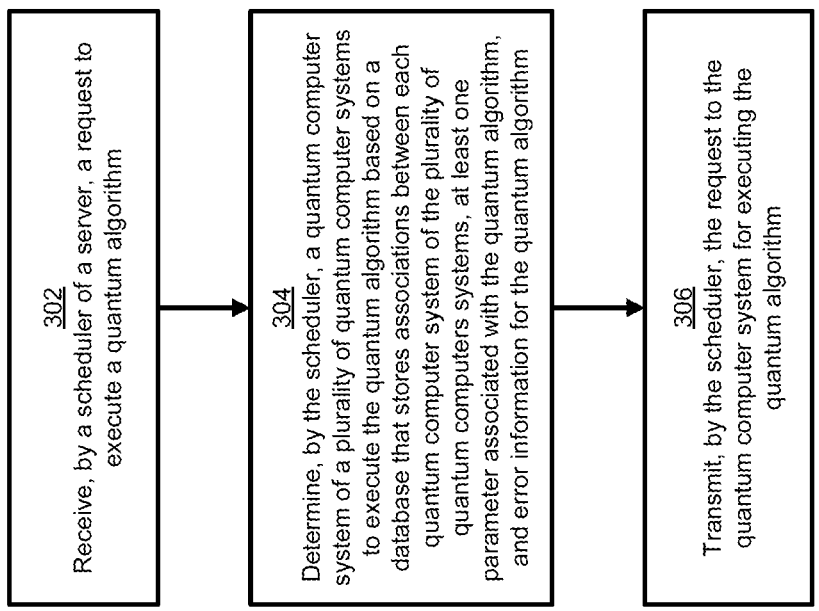
FIG. 3 is a flowchart of a process for quantum computer system scheduling and parameterization based on error correction history according to one example of the present disclosure.

FIG. 3 is a flowchart of a process for quantum computer system scheduling and parameterization based on error correction history according to one example of the present disclosure. In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

In block 302, the processing device 202 may receive, by a scheduler 112 of the server 110, a request 102 to execute a quantum algorithm 107. The quantum algorithm 107 may be associated with a QASM file 109, which may contain a classification ascribed to the quantum algorithm 107 by a developer. The QASM file 109 may also contain other parameters associated with the quantum algorithm 107. The developer may determine the classification based on a predicted disposition for error likelihood in a given quantum machine or a predicted disposition for error likelihood with a given substance of qubit, or other runtime parameters and factors related to execution of the quantum algorithm 107. Alternatively, the scheduler 112 may classify the quantum algorithm 107 based on a simulation of the quantum algorithm 107 performed by the server 110.

In block 304, the processing device 202 may determine, by the scheduler 112, a quantum computer system 120a from a plurality of quantum computer systems 208 based on a database 104 that stores associations between each quantum computer system of the plurality of quantum computer systems 208, at least one parameter 214 associated with the quantum algorithm 107, and the error information 108 for the quantum algorithm 107. The at least one parameter 214 and the error information 108 can be based on a previous execution of the quantum algorithm 107 by the plurality of quantum computer systems 208. The database 104 can include at least one parameter and error information for executions of quantum algorithms of different classifications by the plurality of quantum computer systems 208. The scheduler 112 can select the quantum computer system 120a to execute the quantum algorithm 107 based on the quantum computer system 120a being associated with a fewer number of errors during the previous execution of the quantum algorithm 107, or another quantum algorithm of the same classification, than other quantum computer systems of the plurality of quantum computer systems 208. The scheduler 112 may also determine, based on the at least one parameter 214, a number of qubits reserved for executing the quantum algorithm 107, at least one type of qubit for executing the quantum algorithm, or a location of qubits within the quantum computer system 120a for executing the quantum algorithm 107.

In block 306, the scheduler 112 may transmit the request 102 to the quantum computer system 120a for executing the quantum algorithm 107. A quantum scheduler 122a of the quantum computer system 120a may, during the execution of the quantum algorithm 107, determine additional error information and performance statistics 114 related to the execution of the quantum algorithm 107. Determining the additional error information and performance statistics 114 may involve correlating the additional error information with the performance statistics, recording an occurrence of an error associated with the execution of the quantum algorithm 107 by the quantum computer system 120a, recording a corrective action performed for the occurrence of the error, and recording an effectiveness of the corrective action. The quantum scheduler 122a can transmit the additional error information and performance statistics 114 to the server 110, which can update the at least one parameter 214 associated with the quantum algorithm 107 based on the additional error information and performance statistics 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
receiving, by a scheduler of a server, a request to execute a quantum algorithm;
determining, by the scheduler, a quantum computer system of a plurality of quantum computer systems to execute the quantum algorithm based on a database that stores associations between each quantum computer system of the plurality of quantum computer systems, at least one parameter associated with the quantum algorithm, and error information for the quantum algorithm;

configuring, by the scheduler, the quantum computer system for executing the quantum algorithm by reserving a set of qubits of the quantum computer system for execution of the quantum algorithm and specifying one or more properties for the set of qubits for the execution; and transmitting, by the scheduler, the request to the quantum computer system for executing the quantum algorithm using the set of qubits and the one or more properties.

2. The method of claim 1, further comprising:
determining additional error information and performance statistics related to an execution of the quantum algorithm; and
updating the at least one parameter associated with the quantum algorithm based on the additional error information and the performance statistics.

3. The method of claim 2, wherein determining the additional error information and the performance statistics comprises:
correlating the additional error information with the performance statistics;
recording an occurrence of an error associated with the execution of the quantum algorithm by the quantum computer system;
recording a corrective action performed for the occurrence of the error; and
recording an effectiveness of the corrective action.

4. The method of claim 1, further comprising:
determining, by the scheduler and based on the at least one parameter, a number of qubits to reserve for executing the quantum algorithm, a type of qubits for executing the quantum algorithm, or a location of qubits within the quantum computer system for executing the quantum algorithm.

5. The method of claim 1, further comprising simulating, by the server, an execution of the quantum algorithm to determine the at least one parameter associated with the quantum algorithm.

6. The method of claim 1, further comprising:
accessing a quantum assembly language (QASM) file associated with the quantum algorithm; and
determining the at least one parameter associated with the quantum algorithm based on the QASM file.

7. The method of claim 1, wherein the error information and the at least one parameter associated with the quantum algorithm comprises a type of the quantum computer system, a number of qubits of the quantum computer system, a coherence level of the quantum computer system at given time intervals, a computational complexity of the quantum algorithm, a score of resource utilization associated with the quantum algorithm, a type of error correction performed for the quantum algorithm, or a temperature of the quantum computer system at a given time.

8. A system comprising:
a processing device; and
a memory device including instructions executable by the processing device for causing the processing device to:
receive, by a scheduler of a server, a request to execute a quantum algorithm;
determine, by the scheduler, a quantum computer system of a plurality of quantum computer systems to execute the quantum algorithm based on a database that stores associations between each quantum computer system of the plurality of quantum computer systems, at least one parameter associated with the quantum algorithm, and error information for the quantum algorithm;

configure, by the scheduler, the quantum computer system for executing the quantum algorithm by reserving a set of qubits of the quantum computer system for execution of the quantum algorithm and specifying one or more properties for the set of qubits for the execution; and transmit, by the scheduler, the request to the quantum computer system for executing the quantum algorithm using the set of qubits and the one or more properties.

9. The system of claim 8, wherein the memory device further includes instructions executable by the processing device for causing the processing device to:
determine additional error information and performance statistics related to an execution of the quantum algorithm;
classify the quantum algorithm based on the additional error information and the performance statistics; and
update the at least one parameter associated with the quantum algorithm based on the additional error information and the performance statistics.

10. The system of claim 9, wherein the memory device further includes instructions executable by the processing device for causing the processing device to determine the additional error information and the performance statistics by:
correlating the additional error information with the performance statistics;
recording an occurrence of an error associated with the execution of the quantum algorithm by the quantum computer system;
recording a corrective action performed for the occurrence of the error; and
recording an effectiveness of the corrective action.

11. The system of claim 8, wherein the memory device further includes instructions executable by the processing device for causing the processing device to:
determine, by the scheduler, a number of qubits to reserve for executing the quantum algorithm, a type of qubits for executing the quantum algorithm, or a location of qubits within the quantum computer system for executing the quantum algorithm.

12. The system of claim 8, wherein the memory device further includes instructions executable by the processing device for causing the processing device to:
simulate, by the server, an execution of the quantum algorithm to determine the at least one parameter associated with the quantum algorithm.

13. The system of claim 8, wherein the memory device further includes instructions executable by the processing device for causing the processing device to:
access a quantum assembly language (QASM) file associated with the quantum algorithm; and
determine the at least one parameter associated with the quantum algorithm based on the QASM file.

14. The system of claim 8, wherein the error information and the at least one parameter associated with the quantum algorithm comprises a type of the quantum computer system, a number of qubits of the quantum computer system, a coherence level of the quantum computer system at given time intervals, a computational complexity of the quantum algorithm, a score of resource utilization associated with the quantum algorithm, a type of error correction performed for the quantum algorithm, or a temperature of the quantum computer system at a given time.

15. A non-transitory computer-readable medium comprising program code that is executable by a processing device for causing the processing device to:
receive, by a scheduler of a server, a request to execute a quantum algorithm;
determine, by the scheduler, a quantum computer system of a plurality of quantum computer systems to execute the quantum algorithm based on a database that stores associations between each quantum computer system of the plurality of quantum computer systems, at least one parameter associated with the quantum algorithm, and error information for the quantum algorithm;
configure, by the scheduler, the quantum computer system for executing the quantum algorithm by reserving a set of qubits of the quantum computer system for execution of the quantum algorithm and specifying one or more properties for the set of qubits for the execution; and
transmit, by the scheduler, the request to the quantum computer system for executing the quantum algorithm using the set of qubits and the one or more properties.

16. The non-transitory computer-readable medium of claim 15, further comprising program code that is executable by the processing device for causing the processing device to:
determine additional error information and performance statistics related to an execution of the quantum algorithm;
classify the quantum algorithm based on the additional error information and the performance statistics; and
update the at least one parameter associated with the quantum algorithm based on the additional error information and the performance statistics.

17. The non-transitory computer-readable medium of claim 16, further comprising program code that is executable by the processing device for causing the processing device to determine the additional error information and the performance statistics by:
correlating the additional error information with the performance statistics;
recording an occurrence of an error associated with the execution of the quantum algorithm by the quantum computer system;
recording a corrective action performed for the occurrence of the error; and
recording an effectiveness of the corrective action.

18. The non-transitory computer-readable medium of claim 15, further comprising program code that is executable by the processing device for causing the processing device to:
determine, by the scheduler, a number of qubits to reserve for executing the quantum algorithm, a type of qubits for executing the quantum algorithm, or a location of qubits within the quantum computer system for executing the quantum algorithm.

19. The non-transitory computer-readable medium of claim 15, further comprising program code that is executable by the processing device for causing the processing device to:
simulate, by the server, an execution of the quantum algorithm to determine the at least one parameter associated with the quantum algorithm.

20. The non-transitory computer-readable medium of claim 15, further comprising program code that is executable by the processing device for causing the processing device to:
access a quantum assembly language (QASM) file associated with the quantum algorithm; and
determine the at least one parameter associated with the quantum algorithm based on the QASM file.

* * * * *